Patented Jan. 20, 1931

1,789,926

UNITED STATES PATENT OFFICE

PAUL I. MURRILL, OF PLAINFIELD, NEW JERSEY, AND WALTER W. EVANS, OF LONG-MEADOW, MASSACHUSETTS, ASSIGNORS TO R. T. VANDERBILT COMPANY, INCORPORATED, OF NEW YORK, N. Y., A CORPORATION OF NEW YORK

OIL COMPOSITION, ETC.

No Drawing. Original application filed September 23, 1927, Serial No. 221,607. Divided and this application filed December 31, 1928. Serial No. 329,659.

This invention relates to improvements in oil and fat compositions and to a treatment of vegetable or animal oils and fats to give compositions of greater stability than ordinary vegetable and animal oils and fats.

This case is a division of my prior application Serial No. 221,607, filed September 23, 1927.

According to the present invention there is added to and compounded with the oil or fat a small amount of a condensation product of an aldehyde with an alkylenediaryldiamine, for example, a condensation product of aldol with ethylenediphenyldiamine. The addition of a small amount of such a product materially improves the aging properties of the oil or fat and retards deterioration thereof at high temperatures or when exposed to the action of the air.

The invention is applicable to vegetable and animal oil and fat compositions containing fatty acids or glycerides thereof, such as cutting oils, for example. Cutting oils may be composed entirely of fatty oils, or a mixture of animal or vegetable oils and mineral oils. When not stabilized against deterioration, these tend to become rancid rapidly, particularly during use at elevated temperatures. Deterioration causes an undesirable condition in the oil which may cause irritation when the oil comes into contact with the hands or other parts of the bodies of the workmen using the oils. By incorporating in the cutting oil composition a small amount of a condensation product of an aldehyde with an alkylenediaryldiamine, it is possible to use a greatly increased amount of fatty oil in the composition and still maintain stability of the composition and resistance to rancidity.

The condensation products employed in the process of the present invention to prevent or retard the decomposition or deterioration of oils or greases or compositions containing oils or greases, are made by condensing an aldehyde, such as formaldehyde, acetaldehyde, butyraldehyde, aldol, etc., with an alklene diaryl diamine, such as ethylene, propylene, trimethylene, tetramethylene, or pentamethylene diaryl diamines of which the aryl groups may be phenyl, or substituted phenyl, such as tolyl or naphthyl, etc. The alkylene diaryl diamines can be made, for example, by condensing an alkylene dihalide, such as ethylene dichloride, with an aromatic amine, such as aniline, to produce, for example, ethylene diphenyl diamine. The alkylene diaryl diamines can be condensed with the aldehydes, to form the condensation products employed in the present invention. The condensation products of aldol with the alkylene diaryl diamines, are particularly valuable for use in the present invention, for example, the condensation product of ethylene diphenyl diamine.

The condensation products are employed in the oil or fat compositions in small amounts, usually less than one percent, for example, 0.2 to 0.5 of one percent, although the amount may be increased or decreased.

For example, olive oil may be stabilized if 0.5% of a condensation product obtained by condensing aldol with ethylene di-paratolyldiamine is stirred into the oil while the oil is heated. The tendency of the product thus produced to absorb oxygen is reduced and the oil remains sweet under oxidizing conditions which would turn untreated olive oil rancid.

The action of condensation products employed as stabilizing agents is somewhat obscure but apparently its value lies in the fact that it retards oxidation in the presence of air or oxygen and especially is this true at elevated temperatures.

We claim:

1. An animal or vegetable oil or fat composition containing an animal or vegetable oil or fat and a small quantity of a condensation product of an aldehyde with an alkylenediaryldiamine.

2. A composition comprising a fatty acid or fatty acid glyceride and a fraction of a percent of a condensation product of an aldehyde with an alkylenediaryldiamine.

3. An animal or vegetable oil or fat containing a condensation product of an aldehyde with an alkylenediaryldiamine whose presence prevents or retards decomposition of the oil or fat with resulting rancidity.

4. A fatty acid composition comprising a fraction of a percent of a condensation product of an aldehyde with an alkylenediaryldiamine.

5. A composition comprising an animal or vegetable oil or fat and a fraction of a percent of a condensation product of aldol with ethylenediphenyldiamine.

6. A fatty acid composition comprising a fraction of a percent of a condensation product of aldol with ethylenediphenyldiamine.

In testimony whereof we affix our signatures.

PAUL I. MURRILL.
WALTER W. EVANS.